United States Patent
Luff et al.

(10) Patent No.: US 11,366,904 B2
(45) Date of Patent: Jun. 21, 2022

(54) SECURE CONFIGURATION DATA STORAGE

(71) Applicant: ARM IP LIMITED, Cambridge (GB)

(72) Inventors: Geraint Luff, Cambridge (GB);
Thomas Grocutt, Cambridge (GB);
Milosch Meriac, Cambridge (GB);
Jonathan Austin, Oxford (GB)

(73) Assignee: ARM IP LIMITED, Cambridge (GB)

( * ) Notice: Subject to any disclaimer, the term of this patent is extended or adjusted under 35 U.S.C. 154(b) by 186 days.

(21) Appl. No.: 15/748,788

(22) PCT Filed: Aug. 1, 2016

(86) PCT No.: PCT/GB2016/052370
§ 371 (c)(1),
(2) Date: Jan. 30, 2018

(87) PCT Pub. No.: WO2017/021724
PCT Pub. Date: Feb. 9, 2017

(65) Prior Publication Data
US 2019/0012463 A1    Jan. 10, 2019

(30) Foreign Application Priority Data

Jul. 31, 2015 (GB) .................................. 1513586

(51) Int. Cl.
*G06F 21/57* (2013.01)
*G06F 21/64* (2013.01)
(Continued)

(52) U.S. Cl.
CPC ............ *G06F 21/572* (2013.01); *G06F 21/57* (2013.01); *G06F 21/575* (2013.01); *G06F 21/64* (2013.01);
(Continued)

(58) Field of Classification Search
CPC ........ G06F 21/577; G06F 21/64; G06F 21/74; G06F 2221/2149; H04L 41/0863
See application file for complete search history.

(56) References Cited

U.S. PATENT DOCUMENTS 5,708,776 A    1/1998 Kikinis
5,845,117 A    12/1998 Fujita
(Continued)

FOREIGN PATENT DOCUMENTS

DE    10 2007 040094    2/2009
EP    1 653 321    5/2006
(Continued)

OTHER PUBLICATIONS

U.S. Appl. No. 15/501,559, filed Feb. 3, 2017, Inventor: Meriac et al.
(Continued)

*Primary Examiner* — Ellen Tran
(74) *Attorney, Agent, or Firm* — Nixon & Vanderhye, PC

(57) ABSTRACT

A machine-implemented method for controlling a configuration data item in a storage-equipped device having at least two security domains, comprising receiving, by one of the security domains, a configuration data item; storing the configuration data item; providing a security indication for the configuration data item; and when an event indicates untrustworthiness of the data item, invalidating a configuration effect of the stored configuration data item. Further provided is a machine-implemented method for controlling a storage-equipped device as a node in a network of devices, comprising receiving information that a data source or type of a configuration data item is untrusted; analysing metadata for the data source and the configuration data item; populating a knowledge base with analysed metadata; and responsive to the analysed metadata, transmitting security (Continued)

information to the network of devices. A corresponding device and computer program product are also described.

17 Claims, 8 Drawing Sheets

(51) Int. Cl.
 *G06F 21/74* (2013.01)
 *G06F 21/78* (2013.01)
 *H04L 41/0859* (2022.01)
(52) U.S. Cl.
 CPC .............. *G06F 21/74* (2013.01); *G06F 21/78* (2013.01); *H04L 41/0863* (2013.01); *G06F 2221/2149* (2013.01)

(56) References Cited

U.S. PATENT DOCUMENTS

| | | | |
|---|---|---|---|
| 5,886,576 A | | 3/1999 | Carlson |
| 5,956,408 A | | 9/1999 | Arnold |
| 6,098,117 A | | 8/2000 | Foote |
| 6,539,480 B1 * | | 3/2003 | Drews ................ G06F 21/57 380/279 |
| 6,976,163 B1 | | 12/2005 | Hind et al. |
| 7,437,764 B1 * | | 10/2008 | Sobel .................. G06F 21/562 713/176 |
| 8,327,034 B2 | | 12/2012 | Nystad et al. |
| 8,484,347 B1 | | 7/2013 | Gostev et al. |
| 8,736,299 B1 * | | 5/2014 | Pedersen .......... H03K 19/17768 326/8 |
| 8,782,037 B1 | | 7/2014 | Barad |
| 8,799,334 B1 | | 8/2014 | Stefanov et al. |
| 9,177,122 B1 * | | 11/2015 | Trier ................... G06F 21/572 |
| 9,407,758 B1 | | 8/2016 | Pycko |
| 9,767,317 B1 | | 9/2017 | Chakrovorthy |
| 2001/0051890 A1 | | 12/2001 | Burgess |
| 2004/0054901 A1 | | 3/2004 | England |
| 2004/0268145 A1 | | 12/2004 | Watkins et al. |
| 2007/0006303 A1 | | 1/2007 | Donnelly et al. |
| 2007/0192854 A1 * | | 8/2007 | Kelley ................. G06F 21/53 726/22 |
| 2007/0260738 A1 * | | 11/2007 | Palekar ................ G06F 21/577 709/229 |
| 2008/0140163 A1 | | 6/2008 | Keacher |
| 2008/0263198 A1 | | 10/2008 | Heen et al. |
| 2008/0320312 A1 | | 12/2008 | Duffus et al. |
| 2009/0007275 A1 | | 1/2009 | Gehrmann |
| 2009/0328164 A1 | | 12/2009 | Sunder et al. |
| 2010/0082991 A1 | | 4/2010 | Baldwin |
| 2011/0131403 A1 * | | 6/2011 | Ibrahim ................ G06F 21/572 713/2 |
| 2012/0072734 A1 | | 3/2012 | Wishman et al. |
| 2013/0179669 A1 | | 7/2013 | Song |
| 2013/0262642 A1 | | 10/2013 | Kutch |
| 2014/0068585 A1 | | 3/2014 | Young et al. |
| 2014/0082434 A1 | | 3/2014 | Knight |
| 2014/0164773 A1 | | 6/2014 | Kotla et al. |
| 2014/0189340 A1 | | 7/2014 | Hadley |
| 2014/0221071 A1 | | 8/2014 | Calio |
| 2014/0351882 A1 | | 11/2014 | Marvais |
| 2015/0153911 A1 * | | 6/2015 | Seymour ............... G06F 3/0487 715/765 |
| 2015/0193620 A1 | | 7/2015 | Khatri |
| 2016/0043924 A1 | | 2/2016 | Cejnar |
| 2016/0132378 A1 | | 5/2016 | Jung |
| 2016/0147996 A1 | | 5/2016 | Martinez |

FOREIGN PATENT DOCUMENTS

| | | |
|---|---|---|
| EP | 1 659 810 | 5/2006 |
| EP | 1 796 340 | 6/2007 |
| EP | 2 743 827 | 6/2014 |
| GB | 2 329 266 | 3/1999 |
| WO | WO 2003/067452 | 8/2003 |
| WO | WO 2007/090719 | 8/2007 |
| WO | WO 2007/097700 | 8/2007 |
| WO | WO 2011/083343 | 7/2011 |
| WO | WO 2016/020640 | 2/2016 |
| WO | WO 2017/021683 | 2/2017 |

OTHER PUBLICATIONS

U.S. Appl. No. 15/749,169, filed Jan. 31, 2018, Inventor: Austin et al.
Office Action dated Oct. 1, 2018 in co-pending U.S. Appl. No. 15/501,559, 16 pages.
International Search Report and Written Opinion of the ISA for PCT/GB2016/052370, dated Dec. 21, 2016, 14 pages.
Partial International Search Report for PCT/GB2016/052370, dated Oct. 27, 2016, 5 pages.
Combined Search and Examination Report for GB 1513586.6, dated Nov. 12, 2015, 7 pages.
Further Combined Search and Examination Report for GB 1513586.6, dated Jun. 13, 2016, 7 pages.
International Search Report and Written Opinion of the ISA for PCT/GB2015/052048, dated Dec. 1, 2015, 18 pages.
"Alert Standard Format Specification", Internet Citation, Apr. 23, 2003, XP002449695, 99 pages.
Partial International Search Report for PCT/GB2015/052048, dated Sep. 24, 2015, 6 pages.
Combined Search and Examination Report for GB 1417058.3, dated Mar. 24, 2015, 5 pages.
Further Combined Search and Examination Report for GB 1417058.3, dated Oct. 13, 2015, 5 pages.
International Search Report and Written Opinion of the ISA for PCT/GB2016/052046, dated Sep. 2, 2016, 12 pages.
Combined Search and Examination Report for GB 1513572.6, dated Feb. 5, 2016, 3 pages.
Further Combined Search and Examination Report for GB 1513572.6, dated Jul. 28, 2017, 5 pages.
Final Office Action dated Mar. 8, 2019 in co-pending U.S. Appl. No. 15/501,559, 14 pages.
Office Action dated Jun. 26, 2019 for U.S. Appl. No. 15/749,169, 15 pages.
Office Action dated Jul. 29, 2019 in co-pending U.S. Appl. No. 15/501,559, 13 pages.
Examination Report dated Jan. 29, 2019 in GB Application No. 1513572.6, 6 pages.
"Watchdog Timer", from https://web.archive.org/web/20131030075623/https://en.wikipedia.org/wiki/VVatchdog tirner# Corrective actions from Oct. 30, 2013 retrieved on Dec. 4, 2019, pp. 1-6.
Office Action issued in U.S. Appl. No. 15/501,559 dated Dec. 9, 2019.

* cited by examiner

SECURE CONFIGURATION DATA STORAGE

This application is the U.S. national phase of International Application No. PCT/GB2016/052370 filed Aug. 1, 2016, which designated the U.S. and claims priority to GB Patent Application No. 1513586.6 filed Jul. 31, 2015, the entire contents of each of which are hereby incorporated by reference.

The present invention relates to the securing of configuration data storage in storage-equipped devices.

Since the advent of the Internet, there has been a rapid increase in the interconnectedness of devices capable of storing and processing data. Now, with the development of what is called the Internet of Things (IoT), devices which were not conventionally equipped to store and process data are becoming so equipped. One example is that of a domestic refrigerator that is provided with the capability to recognise encoded data associated with a perishable food item, storing the data in device storage, and subsequently warning a user over a network to a smartphone of an impending "use by" date for the food item.

Such extended capabilities for devices bring advantages, but at the same time the devices may be disadvantageously vulnerable to potentially harmful activity, which may comprise threats to the system or to the wider network, whether caused inadvertently by incorrect programs or, worse, by deliberate insertion of malicious code or of false data that may vitiate the effects of otherwise non-malicious execution code. The interconnectedness of modern devices means that untrustworthy code or data may become widely disseminated over the network, so that it is present in many devices, each of which may in turn act as a new source of onward infection.

A particular problem that may arise is that of untrustworthy configuration data, which may be entered directly into device storage by a human operator, or may be received over a communications channel and programmatically placed in device storage. In some cases, such untrustworthy code or data may become resident in such a way that restarting or resetting the device may not detect or remove it, so that the ill effects continue when the untrustworthy code or data is brought back to life after a restart from where it lay hidden in the configuration data.

For a better understanding of the background to the present technology, it is necessary to make clear that where devices are interconnected into a very wide and heterogeneous network, it would be optimistic to expect that security and integrity, or trustworthiness, can be absolutely guaranteed. Those of skill in the art, therefore, occupy themselves with all possible means of reducing the vulnerability of their systems by constraining, wherever possible, the "attack surface" of the system or device—that is, by reducing the opportunities for malicious or merely inadvertently untrustworthy code and data to enter the system or device, and then, if such code or data is detected, reducing as much as possible its opportunity to cause harm and to spread to other systems.

In a first aspect of the disclosed technology, there is provided a machine-implemented method for controlling a configuration data item in a storage-equipped device having at least two security domains, and comprising the steps of: receiving, by one of said security domains, a said configuration data item; storing said configuration data item in said security domain; providing a security indication for said configuration data item; and when a subsequent event indicates untrustworthiness of said configuration data item, invalidating a configuration effect of said stored configuration data item.

In a second aspect, there is provided a storage-equipped device having at least two security domains and operable for controlling a configuration data item, and comprising: a receiver component operable to receive into one of said security domains a said configuration data item; storage for storing said configuration data item in said one of said security domains; an indicator for providing a security indication for said configuration data item; and an invalidator component, responsive to a subsequent event indicating untrustworthiness of said configuration data item, and operable to invalidate a configuration effect of said stored configuration data item.

In a third aspect, there is provided a computer program product comprising computer-program code tangibly stored on a computer-readable medium, the computer program code executable by a computer system for controlling a configuration data item in a storage-equipped device having at least two security domains, the computer program code comprising code components for performing all the steps of the method of the first aspect. Optional features of the first aspect may be embodied in corresponding code components of the third aspect.

In a fourth aspect, there is provided a machine-implemented method for controlling a storage-equipped device as a node in a network of devices, and comprising steps of: receiving information that a data source of a configuration data item or a type of a configuration data item is untrusted; analysing metadata for said data source and said configuration data item; populating a knowledge base with analysed metadata; and responsive to said analysed metadata, transmitting security information to said network of devices.

In a fifth aspect, there is provided a storage-equipped device operable as a node in a network of devices, and comprising: an input component for receiving information that a data source of a configuration data item or a type of a configuration data item is untrusted; an analyser component operable to analyse metadata for said data source and said configuration data item; a knowledge base operable to be populated with analysed metadata; and an output component responsive to said analysed metadata and operable to transmit security information to said network of devices.

In a sixth aspect there is provided a computer program product comprising computer-program code tangibly stored on a computer-readable medium, the computer program code executable by a computer system for controlling a storage-equipped device as a node in a network of devices, the computer program code comprising code components for performing all the steps of the method of the fifth aspect.

Embodiments of the disclosed technology will be better appreciated by the reader with reference to the appended drawings in which.

Figure 1:
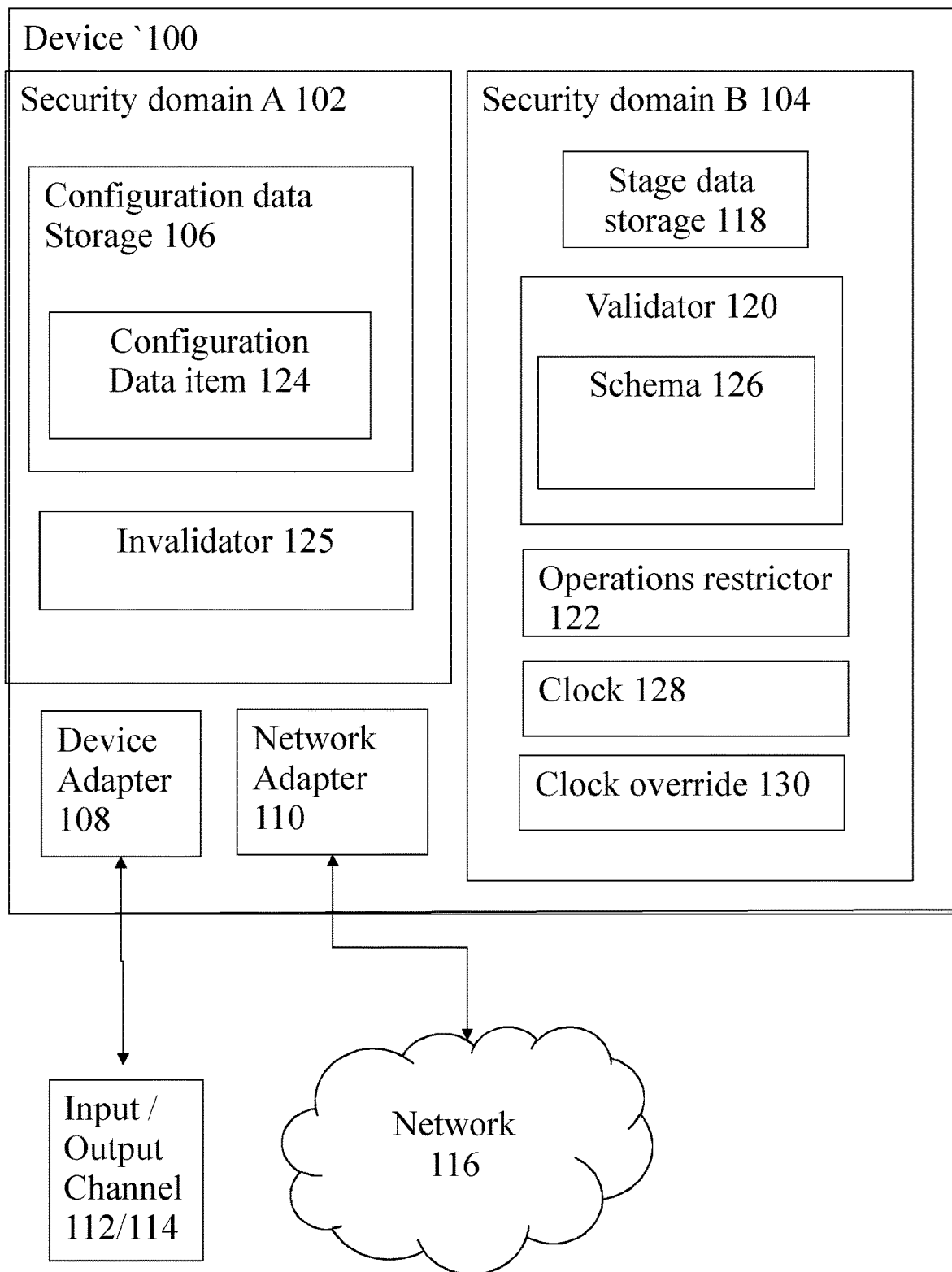
FIG. 1 shows a device in accordance with the secure configuration technology.

Turning now to FIG. 1, there is shown a Device 100 comprising an exemplary pair of security domains, Security domain A 102 and Security domain B 104. Device 100 may be, for example, a controller device for controlling a process or for operating an appliance in accordance with a predetermined plan, or may be operable to receive and execute instructions passed to it from an external source. Such devices typically comprise firmware and data that control the configuration of the device and its relationships with its environment, both physical and virtual. Firmware typically needs to be loaded into Device 100 from a source external to Device 100, and the security of such loading activity is of great importance to the security and integrity of Device 100 and its "ecosystem" of other devices in the network.

Figure 4:
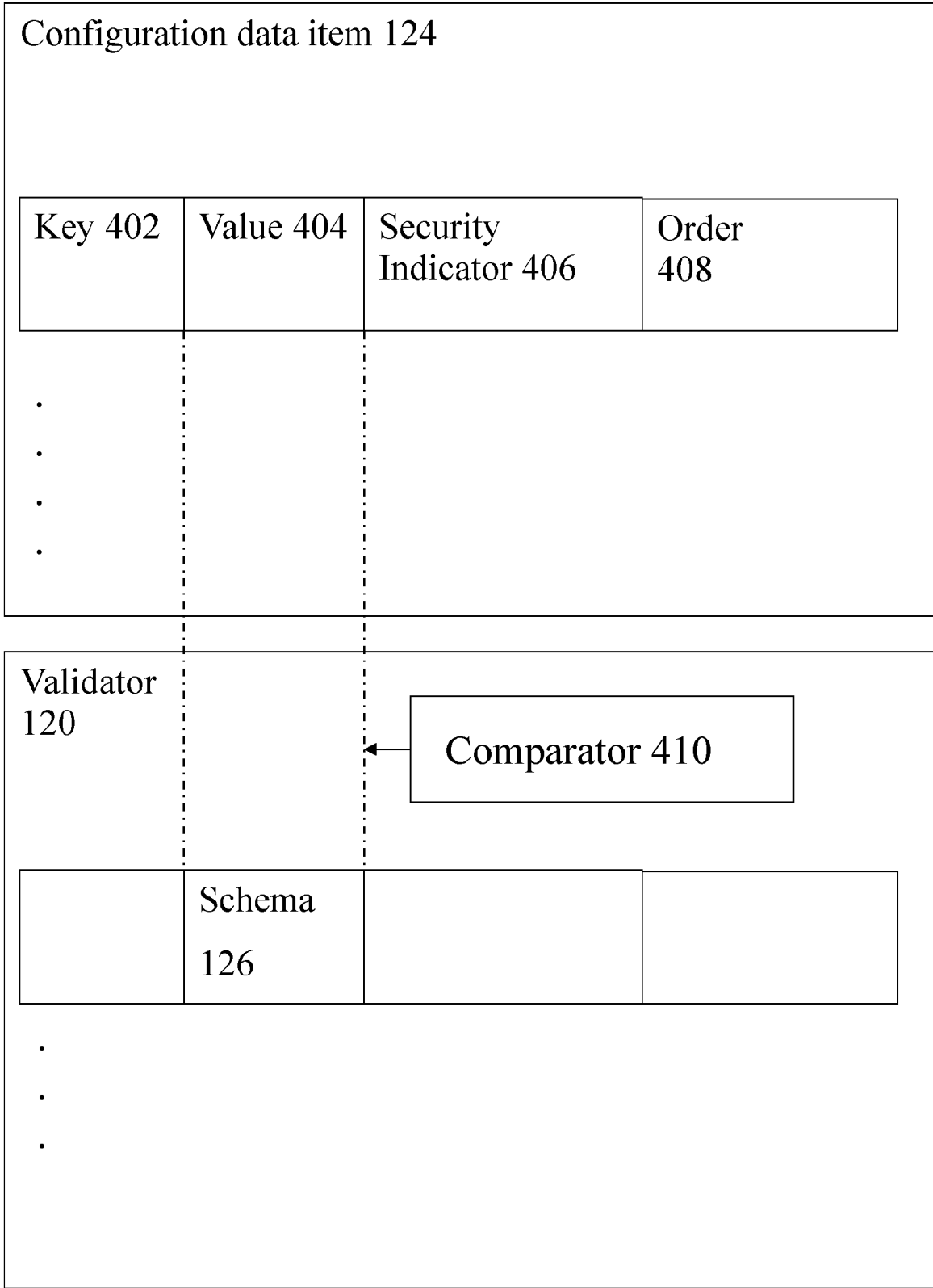
FIG. 4 shows details of schema use in secure configuration storage.

For illustrative purposes, Security Domain A 102 is shown to comprise Configuration data storage 106 adapted to store one or more Configuration data items 124 (a single one of which is shown here for the sake of simplicity). Configuration data storage 106 may comprise permanent or temporary storage, for example, registers or arrays recorded in non-volatile or volatile storage, such as random access memory. Device 100 is provided with a device adapter 108 which is operable in communication with Input and Output Channels 112 and 114. Device 100 is further provided with Network adapter 110, which is operable in communication with Network 116. For clarity of exposition, security domain B 104 will be described in detail below. Turning to Configuration data item 124, a more detailed example is shown in FIG. 4. Configuration data item 124 may comprise a key:value pair, comprising Key 402 and value 404. It may further comprise a Security Indicator 406 and Order 408, an indicator of a time or an order of arrival of Configuration data item 124. The use of Security indicator 406 and Order 408 will be made clear below. Security domain A 102 and Security domain B 104 may be understood to comprise a more-secure domain and a less-secure domain as provided, for example, by the ARM® TrustZone® technology. A practical example of the difference is that a less-secure domain may be one that has connectivity to a public network, such as the Internet, while a more-secure domain may be one that has no such connectivity. For example, the more-secure domain may be completely isolated from public networks and only accessible by means of a directly-connected local channel.

In a first, simplest form of the technology here disclosed, there may thus be provided a secure storage mechanism in Device 100 that requires an indicator of trustworthiness—Security Indicator 406, for example—before it will allow one or more configuration data items 124 to be stored. According to a first approach, the proposed configuration data item 124 (or a set of linked configuration data items of the same input transaction) is accompanied by an authentication certificate (using any of the known techniques for providing such certificates, such as the "trusted third party" system) indicating that the configuration data item can be trusted. Sources of trust can be, for example, provisioning servers, user's devices, input provided by means of a user interface supplied physically on the device, etc. In an alternative, when a device is purchased it may have a set of trusted certificates for updates, and there may also be provided a mechanism for adding other sources of secure configuration data. A potential further problem in the maintenance of trust lies in the time during which device configuration is occurring, when insecure or malicious code or data may be introduced into Configuration data storage 106. One approach to securing Device 100 against such code or data will be described in due course below with reference to FIG. 5.

In FIG. 1, to continue, Configuration data item 124 can be stored into the secure Configuration data storage 106 along with either the certificate or a reduced form of the certificate, such as a partial hash, to form a fingerprint. By thus storing the fingerprint that was used to allow the storage of Configuration data item 124 in the secure storage and, optionally, the date or other indicator of the relative ordering of the operation (Order 408, for example), it is possible to know whether Configuration data item 124 should continue to be trusted when other systems in the network that were configured using the same data are discovered to have been compromised. If Configuration data item 124 is no longer trusted, its effects can be invalidated using Invalidator 125. The detailed operation of Invalidator 125 will be described in due course below.

Returning now to FIG. 1, Security domain B 104 is shown to comprise a Validator 120, which may comprise a Schema 126, or a plurality of such schemas (one is shown here for the sake of simplicity). In more detail, FIG. 4 shows the Validator 120 comprising a Schema 126 which maps the acceptable format or type of data for the value portion of a Configuration data item 124. Validator 120 further comprises a Comparator 410 for comparing Value 404 with Schema 126 to determine the compliance or non-compliance of Value 404 with the acceptable format or data-type.

Accordingly, in a second form of the technology here envisaged, the trustworthiness of Configuration data item 124 may be derived by the application of an algorithm operated by a known more-secure part of the device or system (in this case Security domain B 104), thus verifying trustworthiness from some characteristic of the data item itself before allowing it to be stored, and by this means it can be asserted that any Configuration data item 124 that is in the secure Configuration data storage 106 can be assumed to have been trustworthy at the time of its entry into that secure Configuration data storage 106. One possible method of implementing this approach is to have the Validator 120, which resides in a more-secure part of the system to ensure that its outputs can be relied upon, maintain a set of particular schemas (represented here as Schema 126) associated with reliable Configuration data items 124, and to examine the proposed Configuration data item 124 to determine whether or not it complies with one of the schemas, allowing the system to accept or reject the proposed item on the basis of compliance or non-compliance with a known schema. The schemas themselves may reside in the less-secure domain of the system, provided that they are made read-only to entities in that domain.

It might thus be permissible to allow 'unsigned' data as long as it fits a schema provided by a trusted source. For example, a provisioning server may verify that it is allowing a string of maximum 10 characters to be put in the store, but the string can come from an arbitrary insecure source. The metadata about this transaction would store an indication that the schema was secure. A further example, might be to define the type of data that is expected in a field and to base the trust upon compliance with the data type—for example, verifying that a data item that purports to be a Wi-Fi key actually looks like a Wi-Fi key is useful and reduces the potential attack surface for malicious code or data. The system that performs the validation can be the device itself, another server in the network, or a peer device, provided that Validator 120 is itself trusted.

Using this second approach, an advantageous reduction in the secure storage footprint of each configuration data item may be attained, as no separate metadata trust indicator need be stored in the secure storage alongside the item. This option may thus have value in contexts in which storage space for configuration data is severely limited, such as in portable or wearable devices which need to be as small as possible, and where it is desirable to dedicate as much of the available storage as possible to the application functionality of the device.

The step of providing a security indication may thus comprise providing at least one of: an inherent indication in a characteristic of the configuration data item; a full or partial digital certificate; a reference to a full or partial digital certificate; an indicator of physical presence of an operator; an identifier of a trusted data source; an indicator of a trusted communications channel over which the configuration data item was received; and a compliance with a trusted data schema.

The step of storing the configuration data item may further comprise storing an ordering indicator. Storing the ordering indicator may comprise storing at least one of: a time stamp; a date stamp; a sequence indicator; and a position in a buffer indicator. The step of invalidating a configuration effect may comprise rolling back at least one prior configuration data item according to the ordering indicator.

By storing an ordering indicator, it is possible to maintain a history of the values of configuration data items over time or as a sequence, and thus it is possible to roll-back to 'known secure' configurations. For example, if a device is rebooted because of a security violation, it may be restarted but without any of the data entered in the last N days, repeat with N growing until the device is 'safe' again. Following from this, a device could have a set of 'secure checkpoints', and these could be rolled back to a last known secure checkpoint when the device is found to be compromised.

With either of the above techniques in place, there is provided protection from infectious data being written into the data storage and an ability to revoke configuration changes that were made by an infected or no-longer-trusted device. As well as rolling back configuration data, the device can also ban the untrusted entity from making future changes to the configuration store, but preserve the entity's ability to interact with the device in other ways and for other purposes. Consider a concrete example where an infected smart phone may still be allowed to operate the lights in a house, but is not able to configure them to point to a different firmware update server.

Figure 2:
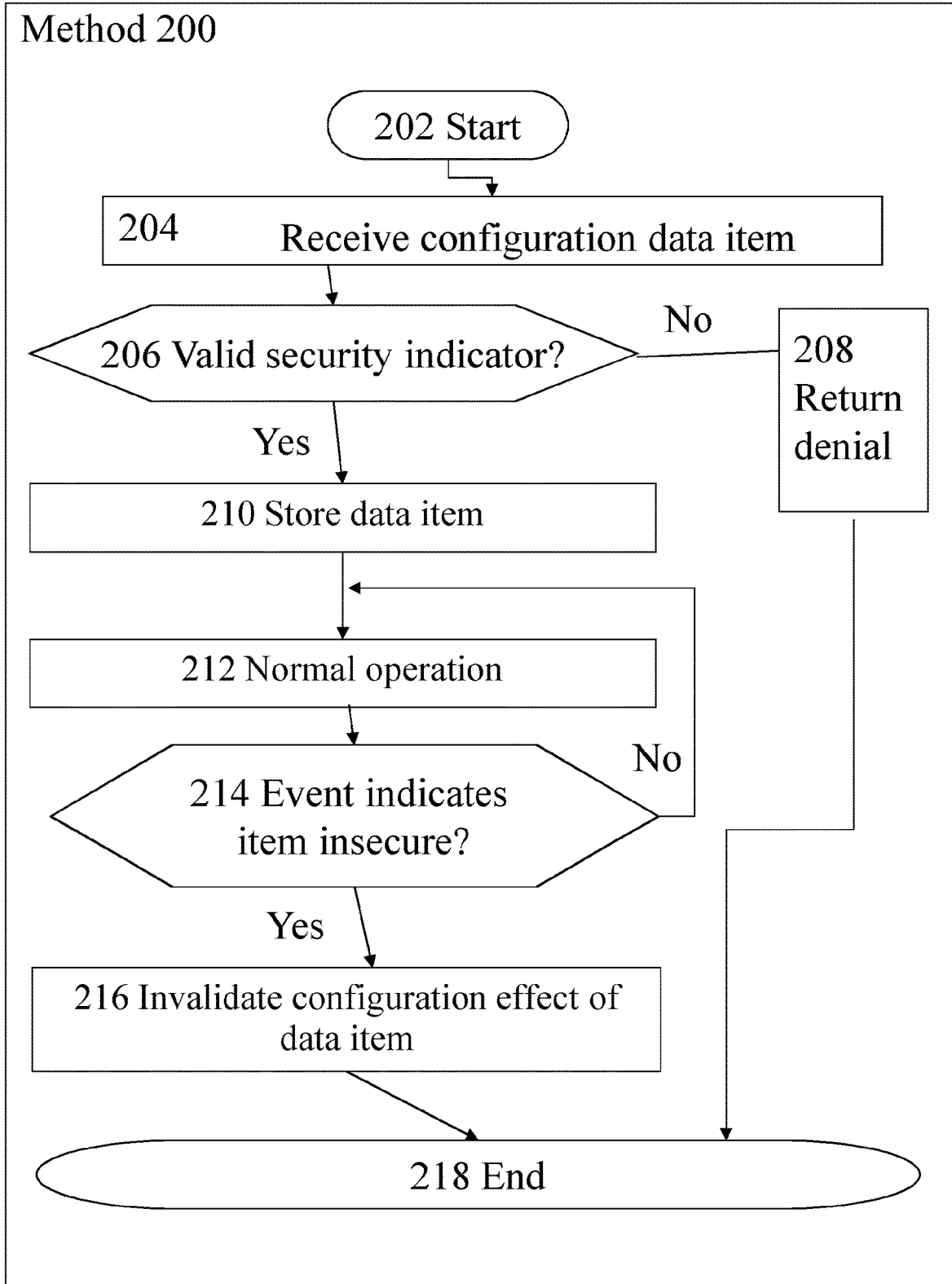
FIG. 2 shows a method of operation of secure configuration storage.

In FIG. 2 is shown an exemplary Method 200 of operation of one example of Device 100. Method 200 begins at Start step 202, and at step 204, a Configuration data item 124 is received. At test step 206, it is determined whether or not there is a valid security indicator associated with Configuration data item 124. If the determination is negative, a denial is returned at step 208—the Configuration data item 124 is not stored in Configuration data storage 106, and the process ends at End step 218. If the determination at step 206 is positive, at step 210 the data item is stored in Configuration data storage 106, along with an optional separate security indicator. In an alternative, an implicit indication of security may be relied upon in future operation, based on the presence of Configuration data item 124 in Configuration data storage 106. Device 100 proceeds to process normally at step 212, listening for events at test step 214 that indicate that Configuration data item 124 is no longer regarded as trustworthy. So long as no such event is detected, the loop comprising steps 212 and 214 continues with normal processing and listening until interrupted. If an event at test step 214 indicates that Configuration data item 124 is no longer regarded as secure, a configuration effect of Configuration data item 124 is invalidated by Invalidator 125 at step 216 and the process ends at End step 218.

Figure 3:
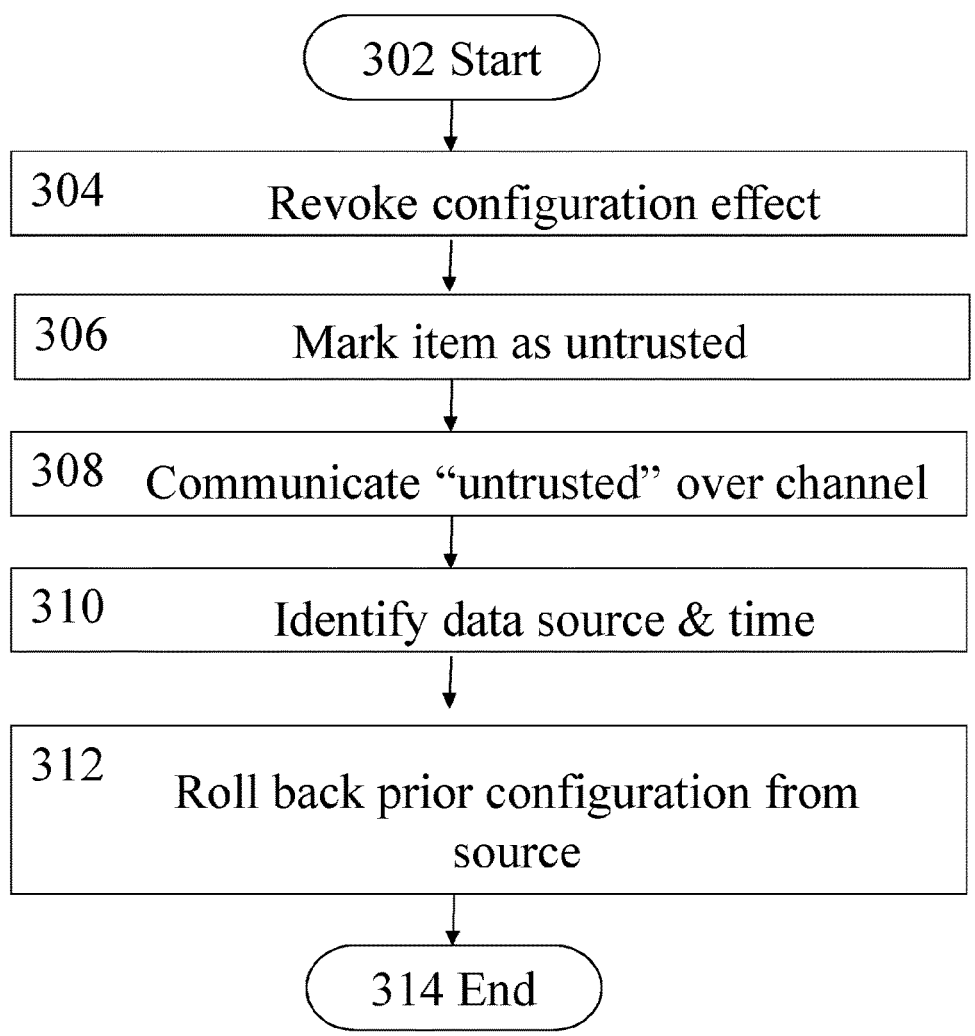
FIG. 3 shows a further method of operation of secure configuration storage.

In FIG. 3 is shown Method 300, which shows the actions that may occur at invalidation step 216 above. The process begins at Start step 302, and at step 304 a configuration effect is invalidated. The invalidating of the configuration effect may comprise at least one of revoking the effect; setting the configuration data item to a default value; temporarily suppressing the effect; and marking a data source of the configuration data item as untrusted. At optional step 306, the item is marked as untrusted, for the benefit of any local process that might attempt to use it. At optional step 308, the fact that the item is untrusted may be communicated over a communications medium such as Input/Output channel 112/114 or Network 116, for the benefit of connected nodes in the wider system. The method may optionally, after marking the data source as untrusted, invalidate a configuration effect of at least one further configuration data item from the data source. At step 310, the data source of the item is identified, and, optionally, the time or position in an ordered sequence at which the item was stored is identified. At step 312, prior configuration effects of the data from the identified source are rolled back, and the process completes at End step 314.

A further extension of the disclosed technique is to create a staging area (represented in FIG. 1 as Stage data storage 118)—where data that is not yet trusted may be placed. Data that is not yet trusted can be entered in any manner, but must be 'confirmed' by a trusted entity before being stored in Configuration data storage 106. Data that is only in Stage data storage 118 is not available after a reboot, making it impossible to cause the re-infection of a device. The ability to access data that is not-yet-trusted could also depend on the security context. For example, the system may not have access to untrusted configuration data while it is operating in a secure mode.

As has been described, when the system receives configuration data or code that represents a potential target for an exploit to persist itself using Configuration data storage 106, one approach to security is to ensure that the operator's physical presence is proved (e.g. by means of a button on the device). The device then enters a more secure mode—e.g. by rebooting without connectivity and optionally re-flashing or verifying any non-secure firmware from a secure place, or by displaying a separate user interface using an interrupt. In one alternative, a trusted network may establish an isolated channel to communicate with the device for the purpose of passing a trusted signal indicating that configuration is permitted.

Thus, where it is possible for malware to store itself in configuration, such that even if the firmware is reset the exploit resurfaces, the presently-disclosed approach is to ensure that elements of configuration data in which such a risk is possible are entered using a secure entry mode. For example, indicating physical presence (e.g. pressing a button) may switch the device to a secure entry mode. This could be continuous (e.g. button held down) or take the form of a pair of signals—one to enter the secure mode and one to save data and exit.

Internally to the device, entering the secure entry mode may be done by means of a secure interrupt—this could present the user interface directly, or may cause the device to reboot in a more secure configuration (e.g. without network connectivity), possibly including a step of resetting the firmware image so that compromised firmware cannot modify the entered input in order to persist.

Using this technique, modification of relevant configuration settings can only be performed from this secure interrupt. Spoofing of this secure configuration user interface can be prevented by, for example, reserving a portion of the screen that is only writeable by code. Such a space could be occupied by a symbol indicating when the secure entry mode is active. If a "quick reset/reboot" method is used, a flag may be set (from the secure code) to indicate that safe mode is active. When configuration is finished, the flag may be unset, and connectivity and other restrictions lifted.

Figure 5:
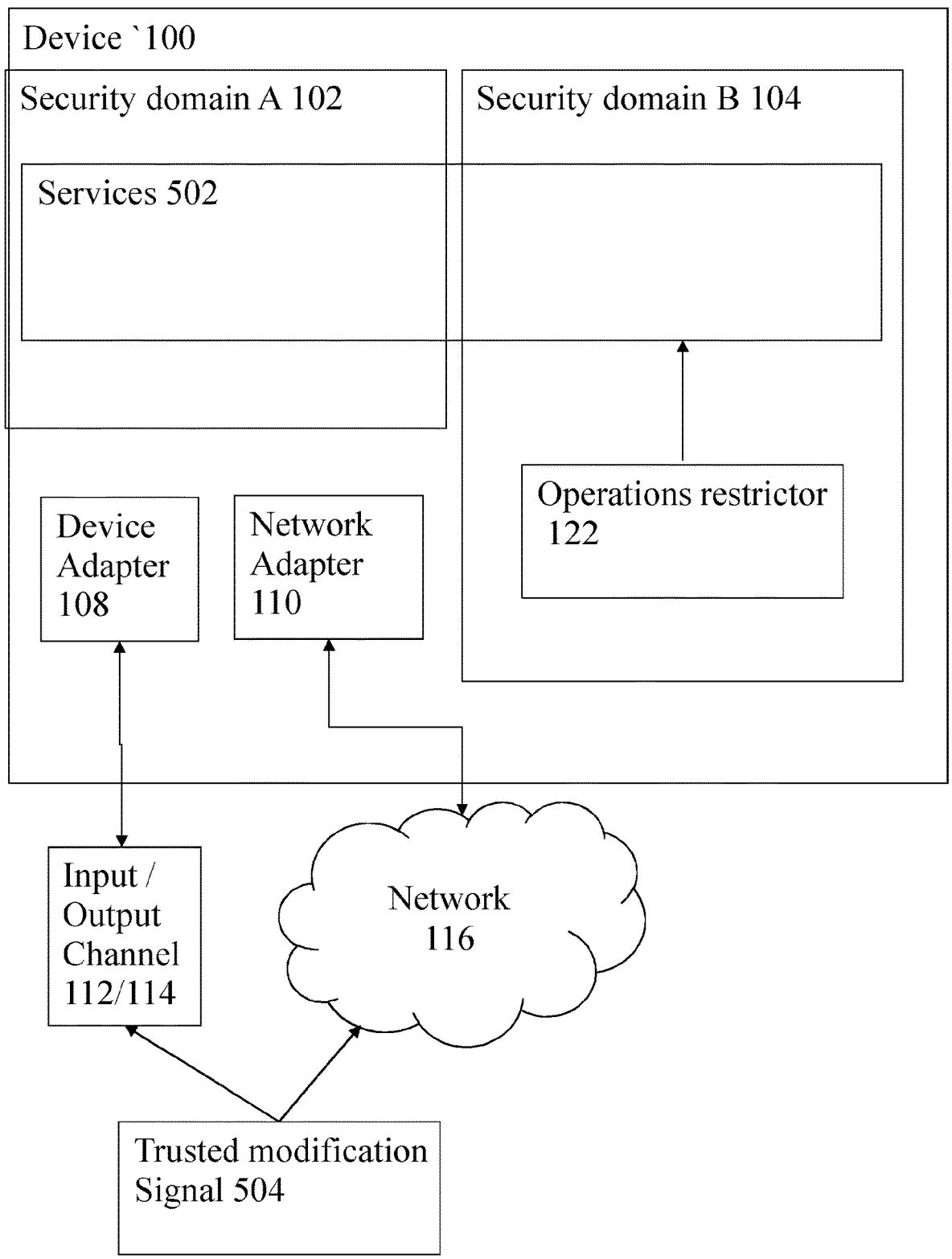
FIG. 5 shows further details of a device in accordance with the technology.

Turning now to FIG. 5, there is shown a further view of Device 100, comprising Security domain A 102 and Security domain B 104, Device adapter 108, Network adapter 110, Input/Output channel 112/114 and Network 116, as already described. Features not relevant to this view of Device 100 are not shown. Device 100 is operable to run Services 502, which may be user application services or system support services, and these Services may operate within Security domain A 102, Security domain B, or in a cross-domain manner. Input/Output channel 112/114 and Network 116 are connected to Device 100 as described above, and are operable to communicate, among other messages, Trusted modification signal 504. Trusted modification signal 504 may take the form of a button click, a button hold-down, or the like signal indicating a physical presence of a user. In one alternative, Trusted modification signal 504 may take the form of a signal over an isolated side channel that has an acknowledged level of trust. Clock component (represented in FIG. 1 as Clock component 128) may be used to limit the time during which configuration data entry may be performed, and, as an extension, clock override (represented in FIG. 1 as Clock override 130)) may be used to override the clock and terminate the time for configuration data entry early.

Figure 6:
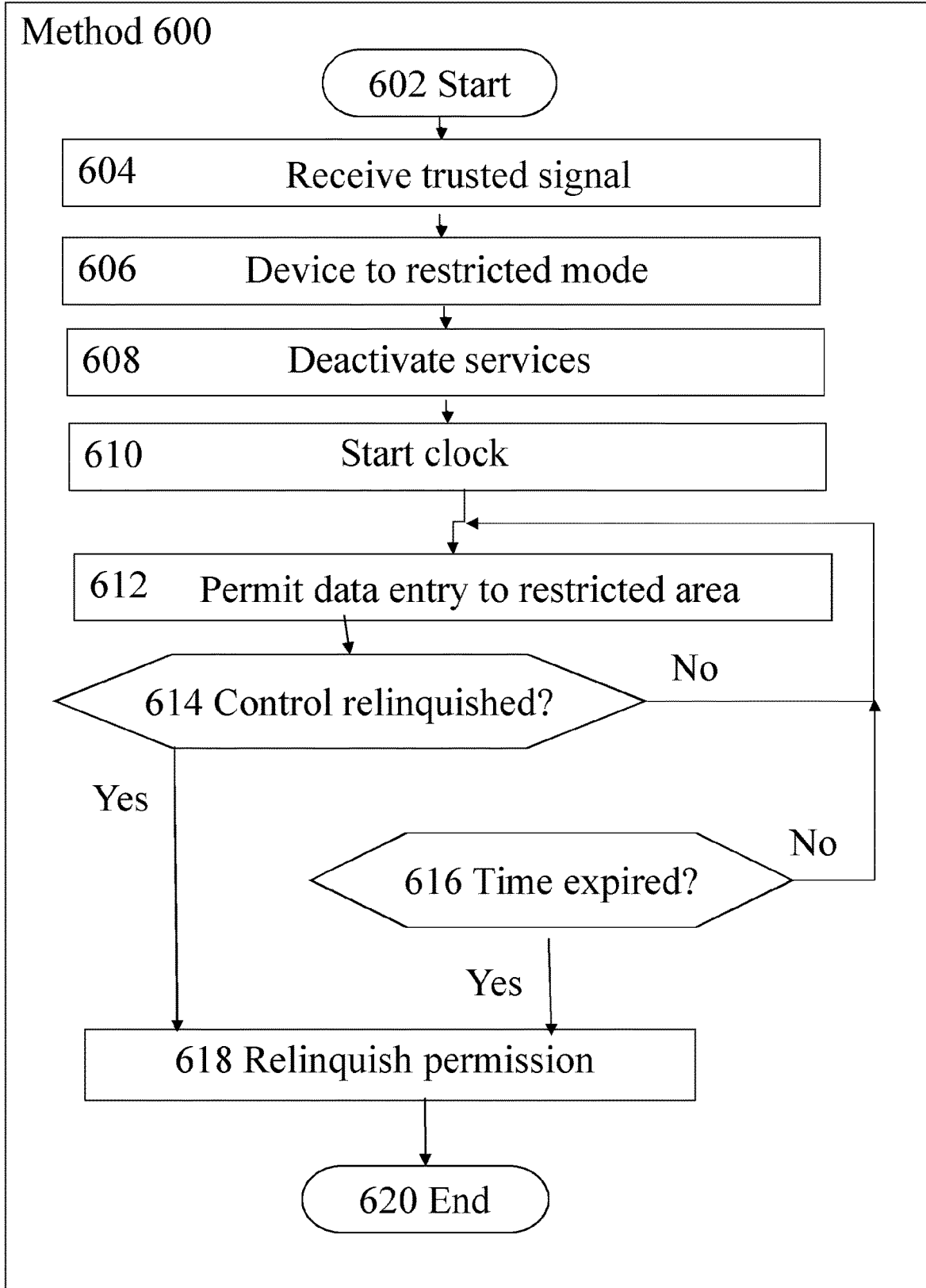
FIG. 6 shows a method of operating an exemplary device.

In FIG. 6 is shown a Method 600 by means of which control of the Configuration data storage at the point of data entry may be achieved, Method 600 commences at Start step 602, and at step 604, a trusted signal is received. Should an attempt be made to access Configuration data storage 106 without such a trusted signal, access is denied, and optionally, a warning signal may be sent to further devices. At step 606, the device is placed in a restricted mode, whereby activity at the user interface or network interface may be limited to reduce the attack surface available to malicious code and data. At step 608, selected services of the device may be deactivated—for example, connectivity to networks may be deactivated to limit the opportunity for malicious code to be introduced by means of network activity during the configuration process. Alternatively or additionally, the device may be rebooted. At step 610, optionally, a clock may be started, by means of which the time period for data entry may be limited. At step 612, permission is granted to enter data into the restricted area for example, to Configuration data storage 106. The restricted area may comprise all or a portion of Configuration data storage 106. During the period when the permission is active, the user or communicating entity that is permitted to enter data into the restricted area may relinquish control at step 614 and thereby indicate that the permission should be relinquished at step 618. The act of relinquishing control at step 614 may comprise entering a command, releasing a held button, a further button click, or ending a state of proximity. In an alternative, when the clock set in step 610 expires, at step 616, the permission is automatically relinquished at step 618. At this point, the process ends at End step 620. Thus the process of entering configuration data into storage may be given additional security by controlling the configuration data entry process.

It will also be clear to one of skill in the art that, with systems as described above in place, much can be learned by heuristics provided in the system, over time, about the nature of malicious code and data infections when they are detected. Consider, for example, an 'IoT health system' that monitors the health of the network. If it notices unusual traffic from a set of nodes, it could query the fingerprint of the entity that provided the last N key:value pairs in the configuration store. If it is found that all misbehaving devices have recently been configured by the same agent, this agent can be investigated to check for compromise. The querying of the fingerprint, rather than any data, is further advantageous in that the system protects the user's privacy. In a system in which there is a conventional mechanism to check for specific data representing a compromise to security, that mechanism could potentially be used to discover the contents of secure storage, e.g. passwords, but this is not possible where the security check is conducted by interrogating the metadata.

Figure 7:
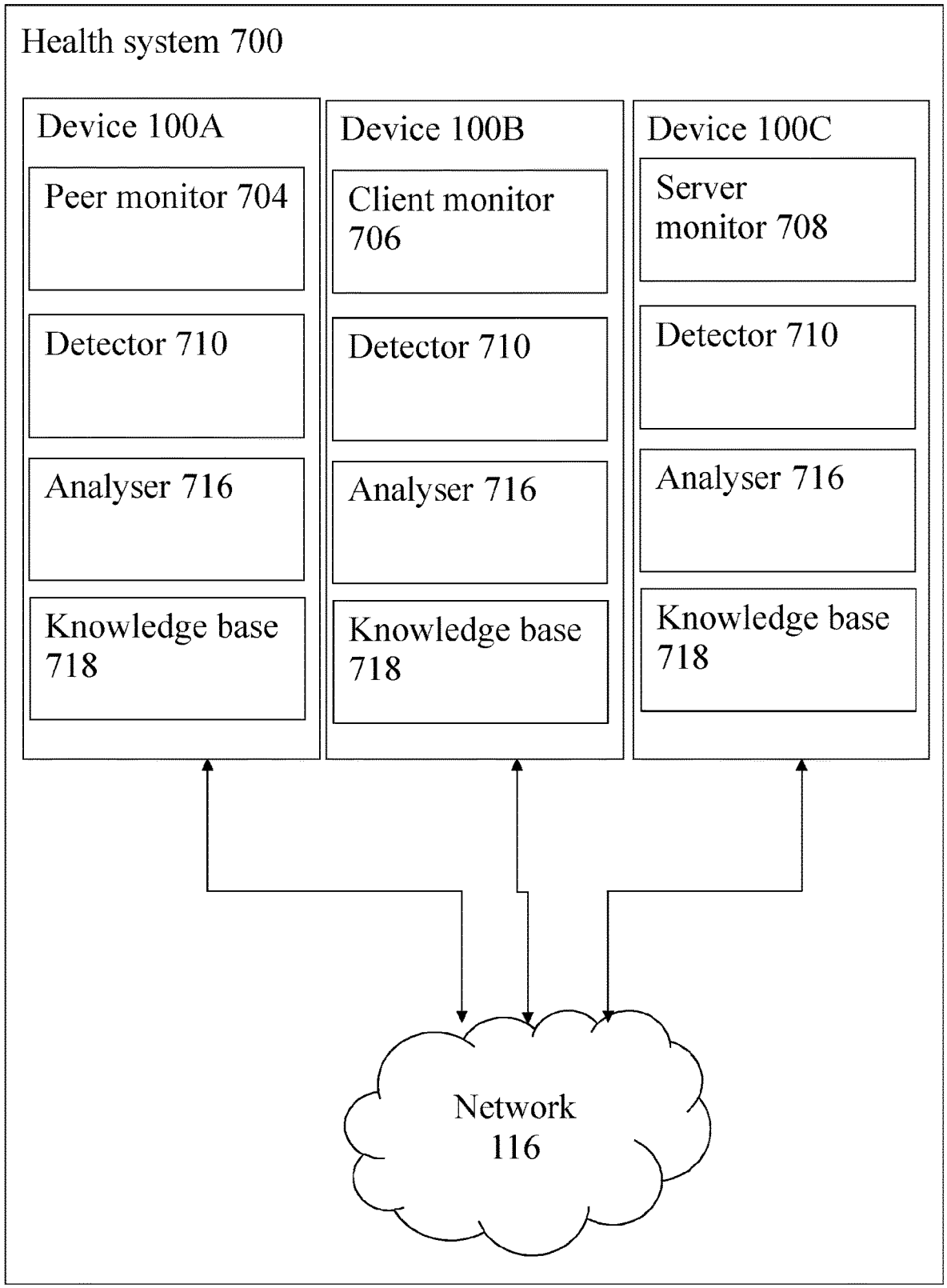
FIG. 7 shows a "health system" of devices.

In FIG. 7 is shown an exemplary IoT health system 700 in which a set of Devices 100A, 100B, 100C are connected over a network. Devices 100A, 100B, 100C are all examples of Device 100 described above with reference to FIG. 1. Devices 100A, 100B, 100C each comprise Detector 710 for detecting events and signals indicating untrustworthiness of data and Analyser 716 for analysing metadata associated with Configuration data items 124—for example, schema compliance metadata, date of arrival in the device, and the like. Devices 100A, 100B, 100C each further comprise Knowledge base 718 for accumulating information and information linkages from which inferences regarding trust in the devices in the system may be drawn. Device 100A operates as a peer in Network 116 having a plurality of peers, over which the processing of Health system 700 may be distributed. In an alternative, Device 100B and Device 100C are operable as a Client-Server pair over a Network 116, in which processing may be delegated between Client monitor 706 and Server monitor 708.

Figure 8:
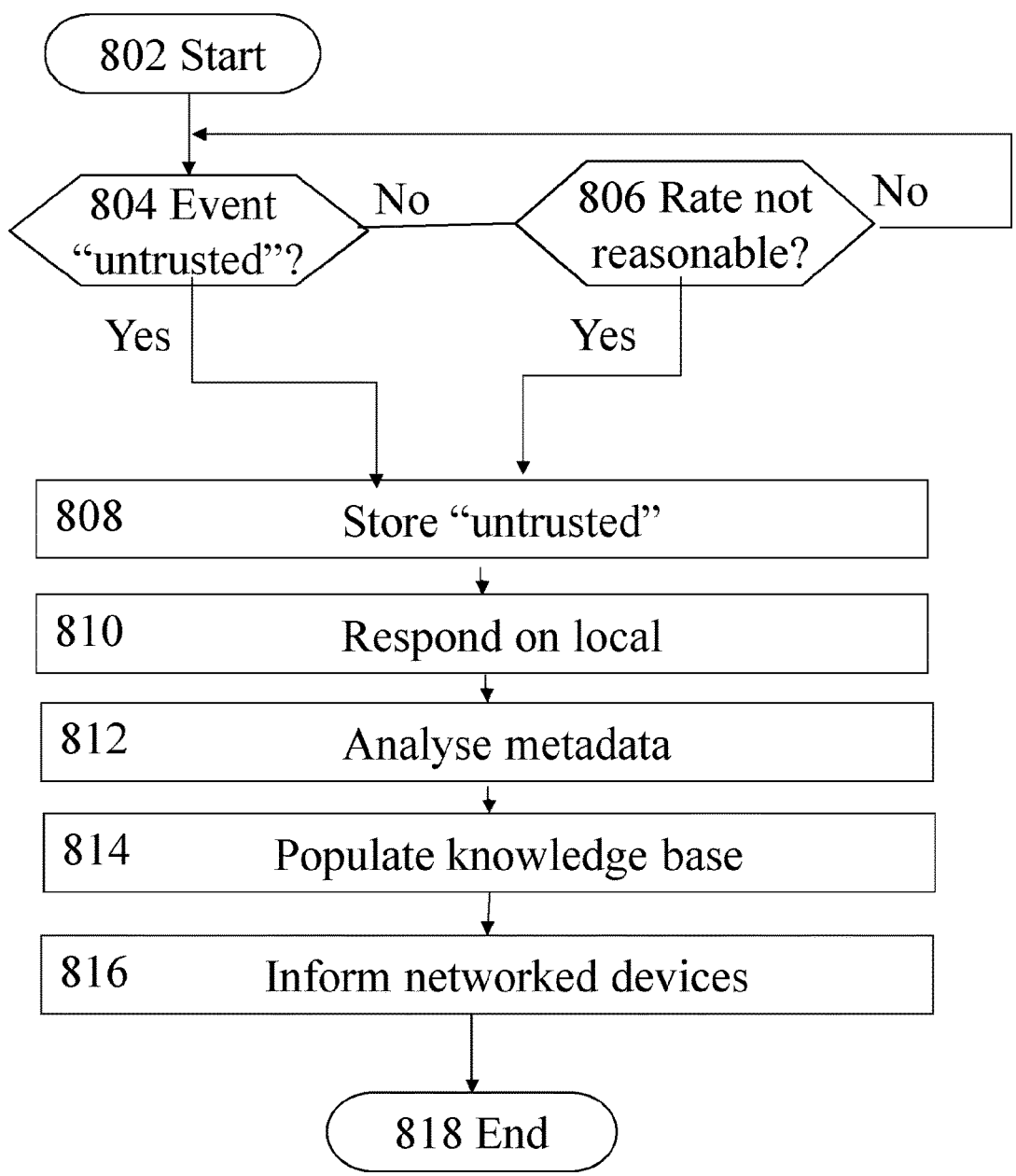
FIG. 8 shows a method of operation of an exemplary "health system".

IoT health system 700 may be operated according to Method 800, as shown in FIG. 8. Method 800 begins a Start step 802. If an event indicating untrustworthiness of data is received at step 804, or if a rate of configuration change appears unreasonable to the system at step 806, Device 100A, 100B, 100C stores an indication of untrustworthiness at step 808. At step 810, the local response is initiated as described above with reference to FIGS. 2 and 3. At step 812, the relevant metadata—including, but not limited to, the source of the data, the time and date of arrival and the like—is analysed by Analyser 716 and compared with other stored metadata, and at step 814, the metadata is used to populate Knowledge base 718. At step 816, the results of the analysis may be communicated to other devices within the network of IoT health system 700, and at End step 818, Method 800 completes.

Thus, the disclosed technique of storing specific metadata in Configuration data storage 106 and permitting it to be analysed allows an IoT health system 700 to create valuable metrics about infections and to discover sources of infectious configuration data. This metadata can also be used to revoke configuration that has come from known infected sources. One possible addition to such an IoT health system is to log configuration attempts and record when there is an unreasonable rate of requests for secure configuration changes and alerting the health system of them. There could be developed a measure of aggregate confidence in certain classes of device, which, over time, builds a profile of the confidence that the whole network has in the configuration sent from a set of devices, thus allowing the system to learn to trust that class of device more than others.

As will be appreciated by one skilled in the art, aspects of the present technology may be embodied as a system, method or computer program product. Accordingly, aspects of the present technology may take the form of an entirely hardware embodiment, an entirely software embodiment, or an embodiment combining software and hardware aspects.

Furthermore, aspects of the present technology may take the form of a computer program product embodied in a computer readable medium having computer readable program code embodied thereon. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

Computer program code for carrying out operations for aspects of the present technology may be written in any combination of one or more programming languages, including object oriented programming languages and conventional procedural programming languages. The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present technology may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present technology may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiments of the present technology may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present invention.

The invention claimed is:

1. A machine-implemented method for controlling a configuration effect of configuration data items previously stored on an Internet of Things (IoT) health system comprising a set of devices connected over a network, the set of devices consisting IoT device types and a provisioning server, at least one device of the set of devices including:
   a detector for detecting events and signals indicating untrustworthiness of configuration data items;
   an analyzer for analyzing metadata associated with configuration data items; and
   a knowledge base for accumulating information and information linkages providing for drawing of inferences regarding trust in devices in the system, the method comprising:
   receiving, at the at least one device, a configuration data item;
   storing, at the at least one device, the configuration data item and metadata related to the configuration data item; and
   when an event indicating untrustworthiness of the configuration data item is detected by the detector or when a rate of configuration change is determined to be unreasonable by the detector, the at least one device stores a security indication of untrustworthiness of the configuration data item and initiates a local response comprising:
   comparing the related metadata of said configuration data item with other stored metadata;
   communicating results of the comparison to other devices in the network; and
   invalidating the configuration effect of said configuration data item.

2. The machine-implemented method as claimed in claim 1, wherein the at least one device comprises at least two security domains, wherein said at least two security domains include at least one secure domain and at least one less-secure domain, wherein the local response further comprises retrieving said configuration data item, and wherein said retrieving comprises receiving into one of the at least one secure domain and the at least one less-secure domain of said at least two security domains.

3. The machine-implemented method as claimed in claim 1, wherein said invalidating the configuration effect comprises at least one of:
   revoking said effect;
   setting said configuration data item to a default value;
   temporarily suppressing said effect; and
   marking a data source of said configuration data item as untrusted.

4. The machine-implemented method as claimed in claim 3, further comprising, after selecting said step of marking said data source as untrusted, invalidating a configuration effect of at least one further configuration data item from said data source.

5. The machine-implemented method as claimed in claim 3, wherein, after selecting said step of marking said data source as untrusted, a message is transmitted over a communications channel to communicate information that at least one of said data source and said configuration data item is untrusted.

6. The machine-implemented method as claimed in claim 2, wherein said step of retrieving said configuration data item further comprises storing an ordering indicator.

7. The machine-implemented method as claimed in claim 6, wherein said step of storing said ordering indicator comprises storing at least one of:

a time stamp;
a date stamp;
a sequence indicator; and
a position in a buffer indicator.

8. The machine-implemented method as claimed in claim 6, wherein said step of invalidating a configuration effect comprises rolling back at least one prior configuration data item according to said ordering indicator.

9. The machine-implemented method as claimed in claim 2, wherein a compliance with a trusted data schema is determined by a program operating in the at least one more secure domain.

10. The machine implemented method as claimed in claim 2, further comprising:
receiving, at the at least one device, a trusted signal.

11. The machine implemented method as claimed in claim 10, wherein the trusted signal indicates the presence of a user.

12. The machine implemented method as claimed in claim 10, further comprising:
placing the at least one device in a restricted mode in response to the trusted signal; and
performing the storing said configuration data item in one of at least two security domains of the at least one device when the at least one device is in restricted mode.

13. The machine implemented method as claimed in claim 12, further comprising:
running services by one or more of: said at least one less secure security domains and said at least one secure security domain.

14. The machine implemented method as claimed in claim 13, further comprising:
deactivating one or more of the services in response to the trusted signal; and/or
rebooting the at least one device to place the at least one device in the restricted mode.

15. The machine implemented method as claimed in claim 13, further comprising:
removing the at least one device from the restricted mode in response to one or more of: a command, releasing a held button, a button click, ending a state of proximity and on expiry of a clock.

16. A storage-equipped device operable for controlling configuration effect of configuration data items previously stored on an Internet of Things (IoT) health system that comprises a set of devices consisting of TOT device types and a provisioning server, and the storage-equipped device being in the set of devices and comprising:
a detector for detecting events and signals indicating untrustworthiness of configuration data items;
an analyzer for analyzing metadata associated with configuration data items; and
a knowledge base for accumulating information and information linkages providing for drawing of inferences regarding trust in devices in a system, the storage-equipped device configured to be operable to perform the method of:
receiving, at the storage-equipped device, a configuration data item;
storing, at the storage-equipped device, the configuration data item and metadata related to the configuration data item; and
when an event indicating untrustworthiness of the configuration data item is detected by the detector or when a rate of configuration change is determined to be unreasonable by the detector, the storage-equipped device stores a security indication of untrustworthiness of the configuration data item and initiates a local response comprising:
comparing the related metadata of said configuration data item with other stored metadata;
communicating results of the comparison to other devices in the network; and
invalidating the configuration effect of said stored configuration data item.

17. A non-transitory computer program product comprising computer-program code tangibly stored on a computer-readable medium of a device, the computer program code executable by the device to perform a method for controlling a configuration effect of configuration data items previously stored on an Internet of Things (IoT) health system comprising a set of devices connected over a network, the set of devices consisting of IoT device types and a provisioning server and the device being in the set of devices, the device comprising:
a detector for detecting events and signals indicating untrustworthiness of configuration data items;
an analyzer for analyzing metadata associated with configuration data items; and
a knowledge base for accumulating information and information linkages providing for drawing of inferences regarding trust in devices in the system, the method comprising:
receiving, at the device, a configuration data item;
storing, at the device, the configuration data item and metadata related to the configuration data item; and
when an event indicating untrustworthiness of the configuration data item is detected by the detector or when a rate of configuration change is determined to be unreasonable by the detector, the device stores a security indication of untrustworthiness of the configuration data item and initiates a local response comprising:
comparing the related metadata of said configuration data item with other stored metadata;
communicating results of the comparison to other devices in the network; and
invalidating the configuration effect of said stored configuration data item.

* * * * *